US008249913B2

(12) United States Patent
Handley et al.

(10) Patent No.: US 8,249,913 B2
(45) Date of Patent: Aug. 21, 2012

(54) SYSTEMS AND METHODS FOR DETECTING SUSPECT METER READS IN A PRINT ENVIRONMENT

(75) Inventors: John C. Handley, Fairport, NY (US); Jeffrey R. Earl, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 337 days.

(21) Appl. No.: 12/564,332

(22) Filed: Sep. 22, 2009

(65) Prior Publication Data

US 2011/0071866 A1  Mar. 24, 2011

(51) Int. Cl.
*G06Q 10/00* (2006.01)

(52) U.S. Cl. ......... 705/7.31; 705/7.37; 705/30; 706/12; 706/46; 706/52

(58) Field of Classification Search ............... 705/7.31, 705/7.37, 7.39, 30, 38, 412; 382/274; 700/29; 706/12, 13, 52
See application file for complete search history.

(56) References Cited

U.S. PATENT DOCUMENTS

| | | | | |
|---|---|---|---|---|
| 5,748,785 | A * | 5/1998 | Mantell et al. | 382/237 |
| 6,064,987 | A * | 5/2000 | Walker et al. | 705/38 |
| 7,567,946 | B2 | 7/2009 | Andreoli et al. | |
| 7,587,330 | B1 * | 9/2009 | Shan | 705/7.31 |
| 7,788,208 | B2 * | 8/2010 | Kobayashi et al. | 706/52 |
| 2002/0099578 | A1 * | 7/2002 | Eicher et al. | 705/7 |
| 2002/0184131 | A1 * | 12/2002 | Gatto | 705/36 |
| 2005/0234837 | A1 * | 10/2005 | Ramachandran et al. | 705/412 |
| 2007/0150077 | A1 * | 6/2007 | Bocharov et al. | 700/29 |
| 2007/0239629 | A1 * | 10/2007 | Ling | 706/12 |

OTHER PUBLICATIONS

E. Gaussier et al. "A Hierarchical Model for Clustering and Categorising Documents", Xerox Research Center Europe.
Thomas Hofmann, "Unsupervised Learning by Probabilistic Latent Semantic Analysis", Machine Learning, 2001, pp. 177-196, vol. 42, Kluwer Academic Publishers, Netherland.
Thomas Hofmann et al., "Unsupervised Learning from Dyadic Data", International Computer Science Institute, 1998, pp. 1-33, Berkeley, California.

\* cited by examiner

*Primary Examiner* — Lynda Jasmin
*Assistant Examiner* — Naima Akida
(74) *Attorney, Agent, or Firm* — Fox Rothschild LLP

(57) ABSTRACT

A system for detecting suspect meter reads in a print environment may include a computing device and a computer-readable storage medium in communication with the computing device. The computer-readable storage medium may include one or more programming instructions for receiving historical meter read values associated with a print-related service, selecting a model set including one or more of the historical meter read values, using a predictive model to determine an anticipated meter read value and a corresponding forecast error value from the model set, determining an updated forecast error value, determining a threshold value, identifying an actual meter read value, determining an average rate associated with the actual meter read value, and flagging the actual meter read value as suspect based on a comparison of the average rate and the threshold value.

20 Claims, 5 Drawing Sheets

SYSTEMS AND METHODS FOR DETECTING SUSPECT METER READS IN A PRINT ENVIRONMENT

BACKGROUND

A managed print service often includes operations that are managed by a second party on behalf of an enterprise. As a form of outsourcing, it allows the enterprise to focus on its core business. Printing, for example, can be viewed as a core infrastructure along with information management and technology.

Meter reads from managed print services are typically used to bill users of those services. For example, customers may be invoiced according to the number of pages they print. If a meter read is exceptional, such as an exceptionally high value or an exceptionally low value, it may be flagged as being suspect. Exceptional meter reads can be an indication of a software error, a customer error and/or the like. Regardless of the cause, however, exceptional meter reads must be reconciled, which often incurs considerable time and cost.

In addition, exceptional meter reads are often flagged based on an average meter rate calculated as the average volume between, for example, the last two invoices. This method for determining exceptional meter reads suffers from several flaws, however. For example, the average meter rate is presumed to be constant between invoice meter reads which does not allow for adaption to legitimately changing behavior. In addition, the average meter rate is typically determined using an unweighted average of activity that occurred in the past. As such, activity that occurred at the beginning of the time period is typically weighted equally with recent activity.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In an embodiment, a system for detecting suspect meter reads in a print environment may include a computing device and a computer-readable storage medium in communication with the computing device. The computer-readable storage medium may include one or more programming instructions for receiving a plurality of historical meter read values associated with a print-related service, selecting a model set including one or more of the plurality of historical meter read values, using a predictive model to determine an anticipated meter read value and a corresponding forecast error value from the model set, determining an updated forecast error value by multiplying a sensitivity value associated with the predictive model by the forecast error value, determining a threshold value by summing the anticipated meter read value and the updated forecast error value, identifying an actual meter read value, determining an average rate associated with the actual meter read value, and flagging the actual meter read value as suspect based on a comparison of the average rate and the threshold value.

In an embodiment, a method of detecting suspect meter reads in a print environment may include receiving a plurality of historical meter read values associated with a print related service, selecting a model set including one or more of the plurality of historical meter read values, using a predictive model to determine, by a computing device, an anticipated meter read value and a corresponding forecast error value from the model set, determining, by the computing device, an updated forecast error value by multiplying a sensitivity value associated with the predictive model by the forecast error value, and determining, by the computing device, a threshold value by summing the anticipated meter read value and the updated forecast error value. The method may also include identifying an actual meter read value, determining an average rate associated with the actual meter read value and flagging the actual meter read value as suspect based on a comparison of the average rate and the threshold value.

BRIEF DESCRIPTION OF THE DRAWINGS

Aspects, features, benefits and advantages of the present invention will be apparent with regard to the following description and accompanying drawings, of which.

DETAILED DESCRIPTION

For purposes of the discussion below, a "print device" refers to a device capable of performing one or more functions, operations and/or services on a print job. For example, a print device may provide print-related services for one or more print jobs. A print device may include a printer, a cutter, a collator or other similar equipment.

An "enterprise" refers to an entity that includes a plurality of print devices. An enterprise may be a freestanding entity or it may be part of a corporation or other entity. Additionally, an enterprise may communicate with one or more servers by way of a local area network or a wide area network, such as the Internet, the World Wide Web or the like.

A "job" refers to a logical unit of work that is to be completed for a customer. In a print environment, a job may include one or more print jobs from one or more clients. A print environment may include a plurality of jobs.

A "print job" refers to a job processed in a print environment. For example, a print job may include printing a document, scanning a document and/or the like.

A "print-related service" refers to a function, operation and/or service that is performed on a print job. For example, copying, scanning, collating and binding are exemplary print-related services.

Figure 1:
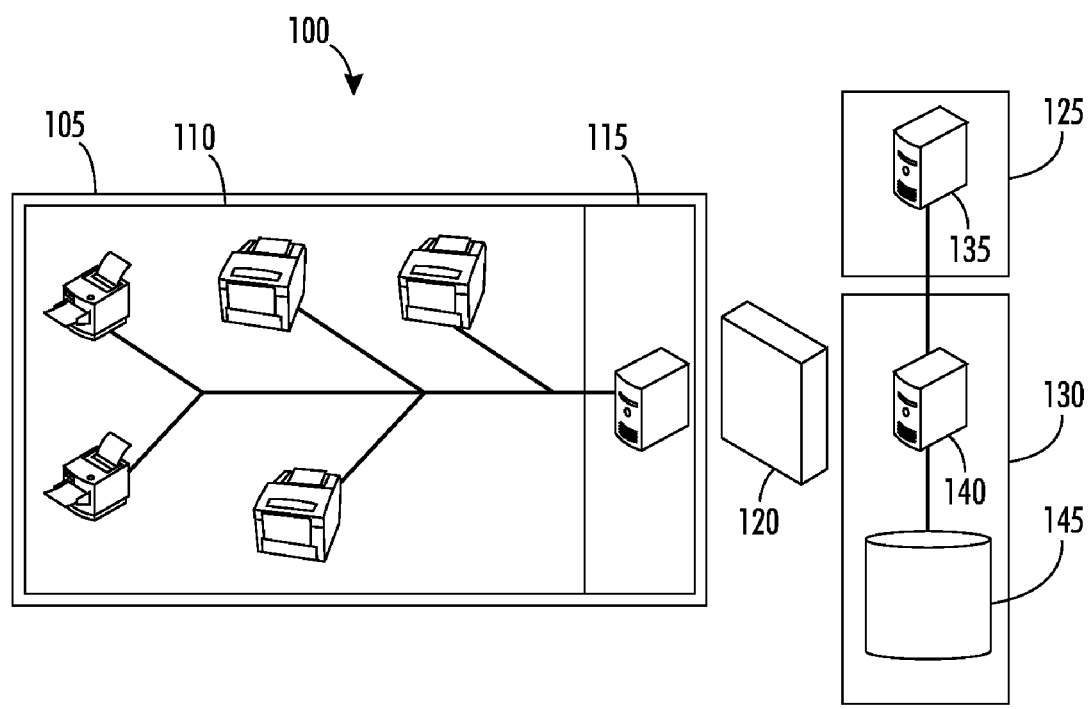
FIG. 1 illustrates an exemplary managed print-service architecture according to an embodiment.

FIG. 1 illustrates an exemplary managed print-service architecture according to an embodiment. As illustrated by FIG. 1, the architecture 100 may include one or more customer enterprises 105. A customer enterprise 105 may include or more print devices 110 that may communicate with one or more computing devices 115, such as a server. In an embodiment, the computing devices 115 may be located within the enterprise. Alternatively, the computing devices 115 may be located remote from the enterprise 105.

In an embodiment, the architecture 100 may include a communications firewall 120, a management service 125 and/or a data warehouse 130. In an embodiment, the management service 125 may include one or more computing devices 135 that may communicate with the data warehouse 130.

The data warehouse 130 may include one or more computing devices 140 and/or one or more computer-readable storage media 145. In an embodiment, the management service 125 and/or the data warehouse 130 may communicate with a customer enterprise 105. For example, a computing device 135 in the management service 125 may communicate with one or more computing devices 115 within the enterprise 105, print devices 110 within the enterprise and/or the like. Similarly, a computing device 140 within the data warehouse 130 may communicate with one or more computing devices 115 within the enterprise 105, print devices 110 within the enterprise and/or the like.

In an embodiment, one or more computing devices 140 in the data warehouse 130 may receive meter read values and/or other data from a customer enterprise 105. The data warehouse 130 may receive these values from computing devices 115 and/or print devices 110 within the enterprise 105. The received information may be stored in the data warehouse 130. In an embodiment, a user of the management service 125, such as an account manager, may use this information to manage a customer's account, generate invoices and/or perform other tasks.

In an embodiment, a management service 125 may be used to collect and analyze meter read values associated with one or more enterprises 105. In an embodiment, a meter read value may be a cumulative count of usage of a print-related service over a period of time. For example, a meter read value may represent the total number of prints, or impressions, for a certain day.

In an embodiment, meter read values may be read at sporadic or inconsistent times. For example, meter read values may be read daily, but certain reads may be missing or irregular. In addition, if a print device is not used for a certain period of time, the meter read value may be constant over that period of time.

Figure 2:
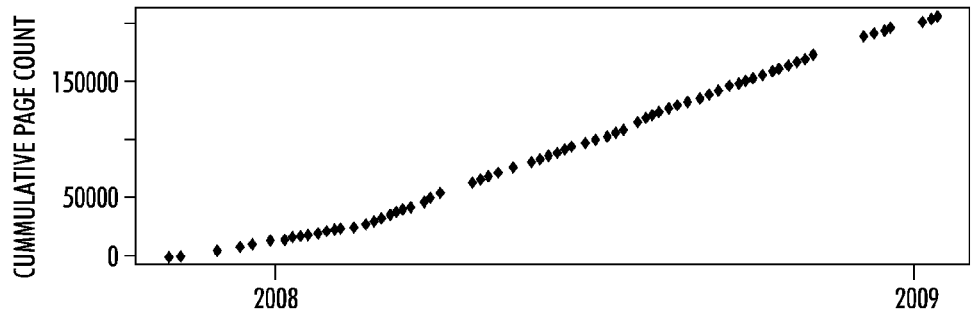
FIG. 2 illustrates an exemplary graph of meter read values according to an embodiment.
Figure 3:
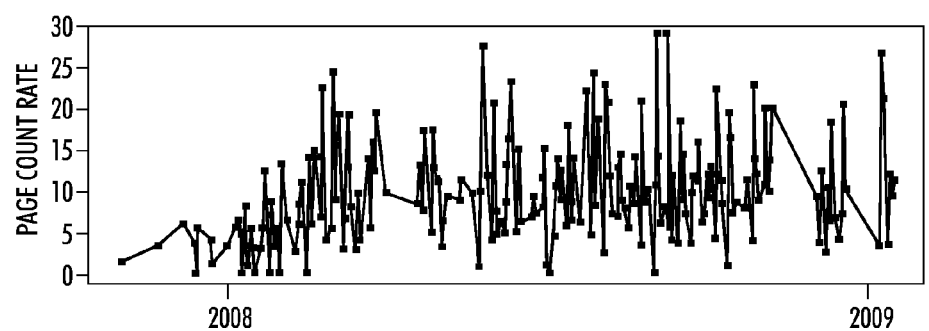
FIG. 3 illustrates an exemplary graph of a rate according to an embodiment.

Because of the potential for irregular reading times, a rate may be used to identify suspect meter read values. In an embodiment, a rate may be a meter read value difference divided by a read date difference between two consecutive reads. FIG. 2 illustrates an exemplary graph of meter read values according to an embodiment. FIG. 3 illustrates an exemplary graph of the rate associated with the meter read values of FIG. 2.

Figure 4:
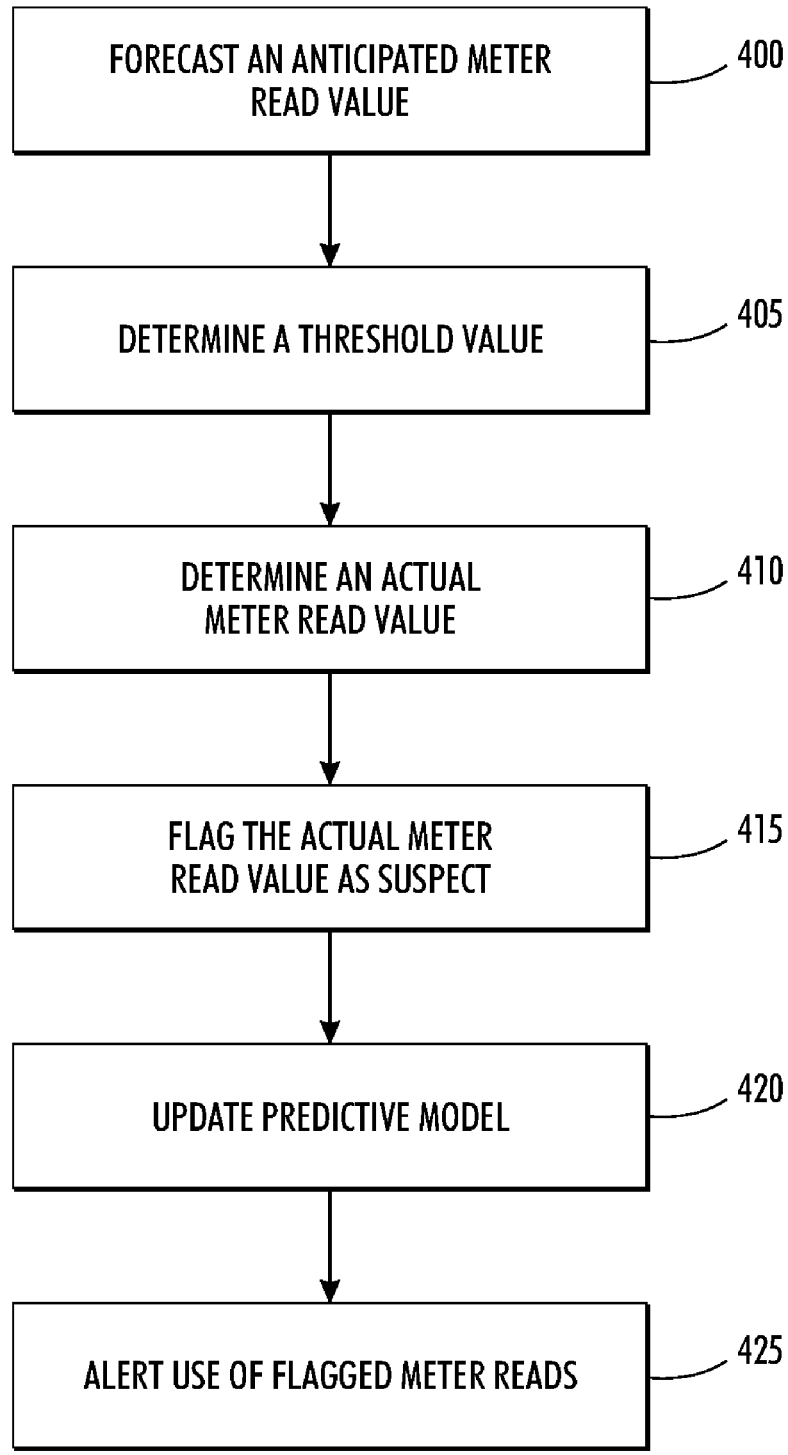
FIG. 4 illustrates an exemplary method of detecting suspect meter reads in a print environment according to an embodiment.

FIG. 4 illustrates an exemplary method of detecting meter malfunctions, such as suspect meter reads, according to an embodiment. As illustrated by FIG. 4, an anticipated meter read value for a print-related service may be determined 400. In an embodiment, a meter read value may be associated with one or more print devices. For example, a meter read value may be the total number of prints associated with a printer for a certain day. Table 1 illustrates exemplary read dates and meter read values according to an embodiment.

TABLE 1

| Read Date | Count |
|---|---|
| 9/26/07 15:16 | 35 |
| 12/08/07 20:18 | 339 |
| 12/10/07 18:02 | 616 |
| 12/11/07 17:59 | 932 |
| 12/12/07 18:02 | 1341 |
| 12/14/07 18:01 | 1523 |
| 12/15/07 20:19 | 1523 |
| 12/17/07 18:03 | 1762 |

In an embodiment, an anticipated meter read value may be determined 400 for a future time period. For example, an anticipated meter read value may be determined 400 for a following day. In an embodiment, an anticipated meter read value may be determined 400 using a predictive model, such as a dynamic linear model and/or the like. The predictive model may incorporate historical meter read values associated with the print-related service. In an embodiment, a historical meter read value may be a meter read value that was observed for a past time period. For example, the number of prints produced by a printer two days ago may be a historical meter read value.

In an embodiment, a predictive model may use a set of information to determine 400 an anticipated meter read value and a forecast error value associated with the anticipated meter read value. The set of information may include one or more historical meter read values. For example, a predictive model may use the meter read values observed for a print related service over the past nine days to determine an anticipated meter read value and a forecast error value associated with the print-related service for the tenth day.

In an embodiment, a model set may include only those historical meter read values that have not been flagged as suspect. In an embodiment, a suspect meter read value may be one that exceeds a threshold value. In an embodiment, a suspect meter read value may be one that does not exceed a threshold value. In an embodiment, a suspect meter read value may be one that equals a threshold value. In an embodiment, a meter malfunction may be a suspect meter read.

In an alternate embodiment, a model set may include historical meter read values that have been flagged as suspect as well as historical meter read values that have not been flagged as suspect.

In an embodiment, $(r_1, t_1), \ldots (r_n, t_n)$, may represent meter read values and corresponding times, where $r_i$ represents a meter read value at time $t_i$.

In an embodiment, meter read values may be converted to rates, by for example, the following:

$$x_i = \frac{(r_i - r_{i-1})}{(t_i - t_{i-1})}$$

In an embodiment, if a rate identified as suspect for being, for example, especially large, then it may be inferred that a corresponding meter read value was suspect as well.

In an embodiment, meter read rates may be assumed to obey a time series model. A Bayesian approach may be used in which the rates may be considered random in time, and the parameters of the model may be considered random. By assuming that the mean and variance of the rate is random, the model may be adapted to new data. In an embodiment, the mean and variance of the rate may be updated as new meter reads become available.

In an embodiment, $x_i = a_i + v$, where $a_i$ is the mean level of the rate process at time $t_i$, and $v$ is normally distributed with a mean of 0 and a variance, Q. Q may have an inverse gamma distribution with parameters $$\frac{n_0}{2}$$

and $$\frac{2}{d_0}: Q \sim \text{InvGamma}$$

$$\left(\frac{n_0}{2}, \frac{2}{d_0}\right).$$

An initial estimate of the parameters may be selected. For example, $n_0 = 4$ may be selected.

In an embodiment, a robust estimate of variance, Q, may be used to calculate an initial estimate of $d_0$, a parameter of the distribution of the variance. For example, the following robust estimate may be used:

$$E(Q) = \frac{\frac{2}{d_0}}{\frac{n_0}{2} - 1}$$

A robust estimate of the variance, Q, may be the median absolute deviation squared. E(Q) may be approximated by the square of the median absolute deviation (mad) of $(x_i, \ldots, x_n)$. Accordingly, $d_0$ may be estimated as $$\frac{2}{(mad(x_1, \ldots, x_n)^2)}$$

for $n_0 = 4$.

In an embodiment, the following parameters may be used to initialize the predictive model:

$(x_1, \ldots, x_n)$ = historical meter read rate values;

$a = \text{median}(x_1, \ldots, x_n)$;

$$d_0 = \frac{2}{(mad(x_1, \ldots, x_n)^2)};$$

$n_0 = 4$, where $n_0$ is a parameter that governs the shape of the distribution of Q;

$$S_0 = \frac{n_0}{d_0},$$

where $S_0$ represents the component of Q which is updated by new data;
R=2, where R is a constant that is chosen to tune the initial behavior of the model. For example, when R has a low value, the model may respond more slowly to the data;
Anticipated meter read value=f=a;
Forecast error value=Q=R+$S_0$.

In an embodiment, as described above, an average rate, $x_i$, associated with a meter read value, $r_i$, over a time period may be represented as:

$$x_i = \frac{r_i - r_{i-1}}{t_i - t_{i-1}},$$

where:

$r_i$ is the actual meter read value at time $t_i$; and
$r_{i-1}$ is the actual meter read value at time $t_{i-1}$.

Table 2 illustrates exemplary rates associated with the meter read values illustrated in Table 1 according to an embodiment.

TABLE 2

| Read Date | Count | Rate |
|---|---|---|
| 9/26/07 15:16 | 35 | N/A |
| 12/08/07 20:18 | 339 | 4.15 |
| 12/10/07 18:02 | 616 | 145.36 |
| 12/11/07 17:59 | 932 | 316.66 |
| 12/12/07 18:02 | 1341 | 408.15 |
| 12/14/07 18:01 | 1523 | 91.03 |
| 12/15/07 20:19 | 1523 | 0 |
| 12/17/07 18:03 | 1762 | 125.42 |

In an embodiment, the predictive model may use this rate, $x_i$, to forecast an anticipated meter read value, $f_{i+1}$; and the forecast error associated with that forecast, $Q_{i+1}$. In an embodiment, the predictive model may be used to determine 405 a threshold value. A threshold value may represent a meter read value above or below which an observed meter read value may be flagged as suspect. In an embodiment, a threshold, $threshold_i$, may be represented by:

$$f_i + qt(p, df=n0)\sqrt{Q}.$$

In an embodiment, the distribution of the anticipated meter read value, qt, may be a Student's t distribution shifted by the anticipated meter read value and scaled by the square root of the estimated forecast error value. In an embodiment, p may represent a sensitivity associated with the predictive model. In an embodiment, p may have a value between 0 and 1. In an embodiment, qt(p, df=n0) may have a value such that a random variable with a Student's t distribution having n0 degrees of freedom (df) is less than or equal to p. For example, if p has a value of 0.999, qt(p, df=n0) may have a value such that a random variable with a Student's t distribution having n0 degrees of freedom is less than or equal to 0.999.

In an embodiment, an actual meter read value may be determined 410. An actual meter read value may be an observed meter read value for the print-related service and/or print device over the time period for which the anticipated meter read value is forecast. In an embodiment, an actual meter read value for a print-related service may be received from a print device providing the print related service. For instance, an actual print count for a period of time may be received from a printer. In an alternate embodiment, an actual meter read value may be received from a user, such as a system administrator, a repair technician and/or other user. In an embodiment, an actual meter read value may be received from a help desk operator who may request this information from a user seeking assistance.

In an embodiment, an actual meter read value may be flagged 415 as suspect based on a comparison of its associated rate and the threshold value. For example, referring to the time period fitted as a time series with a dynamic linear model discussed above, a meter read value $r_i$ may be flagged 415 as suspect if its corresponding rate, $x_i$, exceeds $threshold_i$.

In an embodiment, an actual meter read value may be flagged 415 as suspect if its rate exceeds the threshold value by a certain amount, a certain percentage and/or the like. For example, an actual meter read value may be flagged 415 if its rate exceeds the threshold value by 25% or more. Alternatively, an actual meter read value may be flagged 415 as suspect if its rate is less than the anticipated meter read value by a certain amount, a certain percentage and/or the like. For example, an actual meter read value may be flagged if its rate is less than 25% of the anticipated meter read value.

Figure 5:
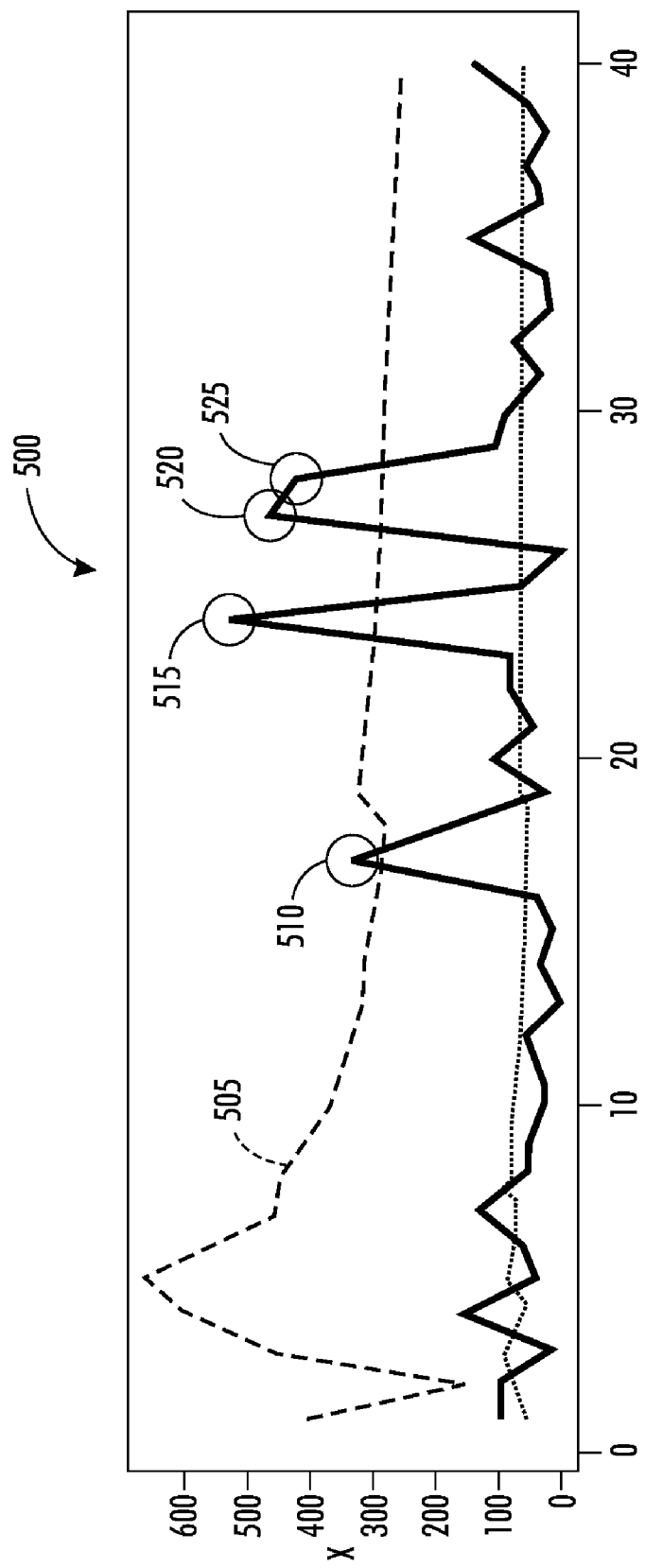
FIG. 5 illustrates a chart of exemplary average meter read values and anticipated meter read values according to an embodiment.

FIG. 5 illustrates a chart of exemplary rates and threshold values according to an embodiment. As illustrated by FIG. 5, if a meter read produces a rate 500 that exceeds a threshold value 505, it may be flagged as suspect 510, 515, 520, 525.

In an embodiment, new meter read values, such as $r_i$, may be used to update 420 the predictive model. For example, a model corresponding to a printer may include historical meter read values through the previous day. When the actual meter read value associated with printing is observed for the current day, that meter read value may be incorporated into the model. Updating 420 the model may allow it to track changing meter read value distributions which may be helpful in forecasting anticipated meter read values.

In an embodiment, each new meter read value that has been flagged as suspect may not be used to update 420 the predictive model. In an alternate embodiment, each new meter read value that has been flagged as suspect may be used to update 420 the predictive model. In an embodiment, at least a portion of the new meter read values that have been flagged as suspect may be used to update 420 the predictive model.

In an embodiment, updating 420 the predictive model may include updating one or more of the associated parameters. For example, the parameters described above may be updated as follows according to an embodiment:

$$d_0 = d_0 + S_0 * (x_i - f_i) * \frac{(x_i - f_i)}{Q};$$

$$n_0 = n_0 + 1;$$

$$a = a + \frac{R * (x_i - f_i)}{Q};$$

-continued $$R = 1 + \left(\frac{d_0}{S_0}\right) * \left(\frac{R\left(1 - \frac{R}{Q}\right)}{n_0}\right);$$

$$S_0 = \frac{d_0}{n_0};$$

$$f = a;$$

$$Q = R + S_0.$$

In an embodiment, a user may be alerted 425 to the existence of one or more flagged meter read values. For example, a message may be displayed to a user on a graphical user interface informing the user of one or more flagged meter read values. For example, one or more flagged meter read values may be displayed to a user on a computer, a mobile computing device, a print device and/or the like. The flagged meter read values may be displayed as a graphical representation, a chart representation and/or the like.

In an embodiment, the user may be presented with information associated with the flagged meter read value, such as the type of print-related service and/or the print device associated with the flagged meter read value, the location of the print device, the date of the flagged meter read value and/or the like. In an embodiment, the user may determine which, if any, of the flagged meter read values should be used to update the predictive model.

Figure 6:
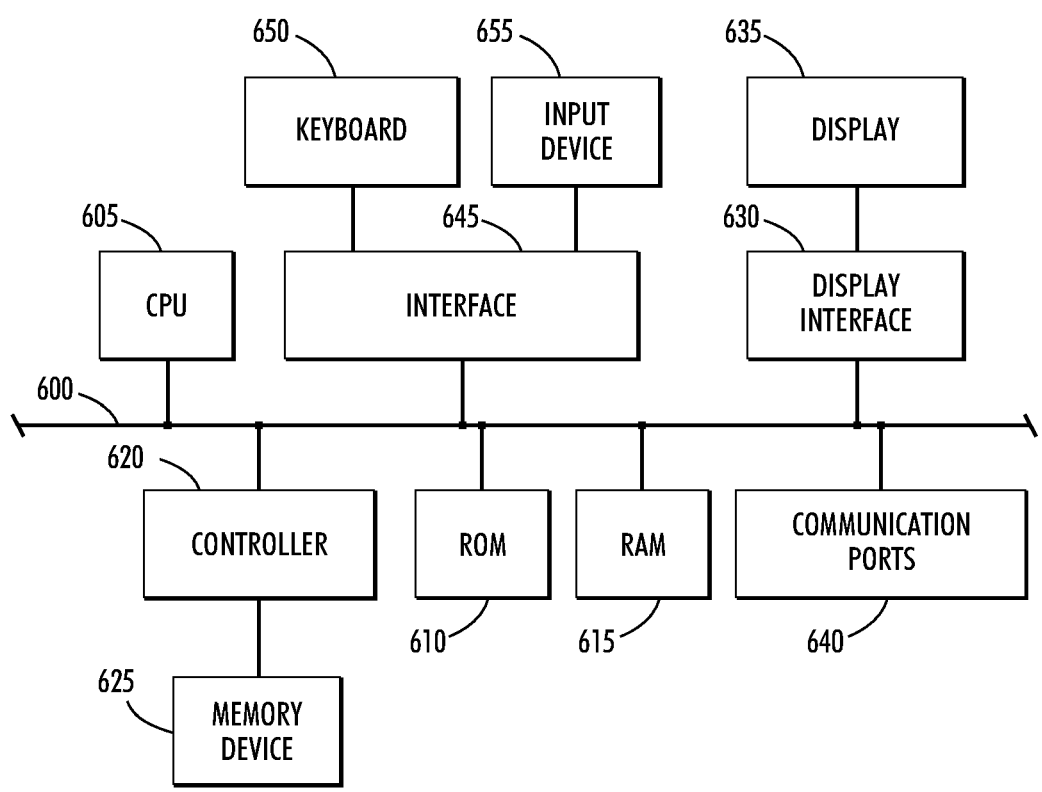
FIG. 6 illustrates a block diagram of exemplary internal hardware that may be used to contain or implement program instructions according to an embodiment.

FIG. 6 depicts a block diagram of exemplary internal hardware that may be used to contain or implement program instructions according to an embodiment. A bus 600 serves as the main information highway interconnecting the other illustrated components of the hardware. CPU 605 is the central processing unit of the system, performing calculations and logic operations required to execute a program. Read only memory (ROM) 610 and random access memory (RAM) 615 constitute exemplary memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions may be stored in the ROM 610 and/or the RAM 615. Optionally, program instructions may be stored on a tangible computer readable storage medium such as a compact disk, a digital disk, flash memory, a memory card, a USB drive, an optical disc storage medium, such as Blu-ray™ disc, and/or other recording medium.

An optional display interface 630 may permit information from the bus 600 to be displayed on the display 635 in audio, visual, graphic or alphanumeric format. Communication with external devices may occur using various communication ports 640. An exemplary communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for detecting suspect meter reads in a print environment, the system comprising:
   a computing device; and
   a computer-readable storage medium in communication with the computing device, the computer-readable storage medium comprising one or more programming instructions for:
      receiving a plurality of historical meter read values associated with a print-related service, wherein each historical meter read value represents a measure of a usage of the print-related service over a period of time,
      selecting a model set comprising one or more of the plurality of historical meter read values,
      using a predictive model to determine an anticipated meter read value and a corresponding forecast error value from the model set,
      determining a threshold value by shifting a distribution of the anticipated meter read value by the anticipated meter read value and scaling the distribution by a square root of the forecast error value,
      identifying an actual meter read value,
      determining a rate associated with the actual meter read value, wherein the rate is a ratio of a difference value between a first meter read value and a second meter read value to an amount of time between an occurrence of the first meter read value and an occurrence of the second meter read value,
      comparing the rate and the threshold value, and
      flagging the actual meter read value as suspect based on the comparison of the rate and the threshold value.

2. The system of claim 1, wherein the one or more programming instructions for using a predictive model to forecast an anticipated meter read value comprise one or more programming instructions for modeling the model set as a dynamic linear model.

3. The system of claim 1, wherein the one or more programming instructions for receiving a plurality of historical meter read values comprise one or more programming instructions for receiving at least a portion of the historical meter read values from one or more of the following:
   a user;
   an enterprise; and
   a print device.

4. The system of claim 1, wherein the one or more programming instructions for selecting a model set comprise one or more programming instructions for excluding from the model set historical meter read values that have been flagged as suspect.

5. The system of claim 1, wherein the one or more programming instructions for selecting a model set comprise one or more programming instructions for including in the model set historical meter read values that have been flagged as suspect.

6. The system of claim 1, wherein the one or more programming instructions for determining a rate comprise one or more programming instructions for:
   identifying, from the model set, a the first meter read value and a the second meter read value, wherein the first meter read value occurred prior to the second meter read value.

7. The system of claim 1, wherein the one or more programming instructions for flagging the actual read value as suspect comprise one or more programming instructions for flagging the actual meter read value as suspect if the rate exceeds the threshold value.

8. The system of claim 1, wherein the computer-readable storage medium further comprises one or more programming instructions for: in response to flagging the actual meter read value as suspect, not using the actual meter read value to update the predictive model.

9. The system of claim 1, further comprising a display device, wherein the computer-readable storage medium further comprises one or more programming instructions for displaying the flagged actual meter read value to a user on the display device.

10. A method of detecting suspect meter reads in a print environment, the method comprising:
    receiving a plurality of historical meter read values associated with a print related service receiving a plurality of historical meter read values associated with a print-related service, wherein each historical meter read value represents a measure of a usage of the print-related service over a period of time;
    selecting a model set comprising one or more of the plurality of historical meter read values;
    using a predictive model to determine, by a computing device, an anticipated meter read value and a corresponding forecast error value from the model set;
    determining a threshold value by shifting a distribution of the anticipated meter read value by the anticipated meter read value and scaling the distribution by a square root of the forecast error value;
    identifying an actual meter read value;
    determining a rate associated with the actual meter read value, wherein the rate is a ratio of a difference value between a first meter read value and a second meter read value to an amount of time between an occurrence of the first meter read value and an occurrence of the second meter read value;
    comparing the rate and the threshold value, and
    flagging the actual meter read value as suspect based on the comparison of the rate and the threshold value.

11. The method of claim 10, wherein using a predictive model to forecast an anticipated meter read value comprises modeling the model set as a dynamic linear model.

12. The method of claim 10, wherein receiving a plurality of historical meter read values comprises receiving at least a portion of the historical meter read values from one or more of the following: a user; an enterprise; and a print device.

13. The method of claim 10, wherein selecting a model set comprises excluding from the model set historical meter read values that have been flagged as suspect.

14. The method of claim 10, wherein selecting a model set comprises including in the model set historical meter read values that have been flagged as suspect.

15. The method of claim 10, wherein determining a rate comprises:
    identifying, from the model set, the first meter read value and the second meter read value, wherein the first meter read value occurred prior to the second meter read value.

16. The method of claim 10, wherein flagging the actual meter read value as suspect comprises flagging the actual meter read value as suspect if the rate exceeds a percentage of the threshold value.

17. The method of claim 10, wherein flagging the actual read value as suspect comprises flagging the actual meter read value as suspect if the rate is less than a percentage of the threshold value.

18. The method of claim 10, wherein flagging the actual read value as suspect comprises flagging the actual meter read value as suspect if the rate exceeds the threshold value.

19. The method of claim 10, further comprising:
in response to flagging the actual meter read value as suspect, not using the actual meter read value to update the predictive model.

20. The method of claim 10, further comprising:
in response to flagging the actual meter read value as suspect, using the actual meter read value to update the predictive model.

* * * * *